United States Patent [19]

Evans et al.

[11] Patent Number: 5,331,672
[45] Date of Patent: Jul. 19, 1994

[54] AUTOMATIC DETECTOR AND SELECTOR OF RS-232 OR V.35 INTERFACE

[75] Inventors: Patrick A. Evans, Southington; Eugene Vellucci, Jr., Terryville, both of Conn.

[73] Assignee: General DataComm, Inc., Middlebury, Conn.

[21] Appl. No.: 727,822

[22] Filed: Jul. 9, 1991

[51] Int. Cl.$^5$ ............................................. H04L 23/00
[52] U.S. Cl. ...................................... 375/121; 375/8
[58] Field of Search .............. 375/8, 121, 36; 379/93, 379/413; 370/84; 307/475; 395/325

[56] References Cited

U.S. PATENT DOCUMENTS

| | | | |
|---|---|---|---|
| 4,580,239 | 4/1986 | Greenhill et al. | 395/325 |
| 4,646,320 | 2/1987 | Krishnam | 375/8 |
| 4,680,781 | 7/1987 | Amundson et al. | 375/8 |
| 4,852,041 | 7/1989 | Nakano | 375/121 |
| 4,931,250 | 6/1990 | Greszczuk | 375/8 |
| 5,032,819 | 7/1991 | Sakuragi et al. | 375/8 |
| 5,121,342 | 6/1992 | Szymborski et al. | 375/10 |

OTHER PUBLICATIONS

"Interface Between Data Terminal Equipment and Data Circuit-Terminating Equipment Employing Serial Binary Data Interchange" Electronic Industries Association, Approved Nov. 12, 1986, ANSI/EIA-232-D-1986.

Primary Examiner—Stephen Chin
Assistant Examiner—T. Ghebretinsae
Attorney, Agent, or Firm—David P. Gordon

[57] ABSTRACT

An automatic detection and selection circuit resident in a DCE is provided. The circuit is coupled to the DCE interface connector and detects receipt by the DCE of V.35 and RS-232 transmit data signals, distinguishes between those signals, and selects circuitry for passing the data therethrough. The circuit comprises a switch coupled to a first TX data terminal (pin 2 or P) of the DCE interface connector, first and second line receiving circuits, a microprocessor, and a relay. The first line receiving circuit is coupled to a first pole of the switch and to the second TX data terminal (pin S) of the DCE interface connector and provides indications as to whether or not an input signal is present at at least one of pins P and S. The second line receiving circuit is coupled to the second pole of the switch and provides indications as to whether or not a valid RS-232 transmit data signal is detected. The microprocessor is coupled to the outputs of the line receiving circuits, and based on the indications output thereby, appropriately controls the relay, and hence the switch. The microprocessor first checks in a V.35 mode as to whether a data signal is being received. It then checks in a RS-232 mode as to whether the data signal is a valid RS-232 signal. If not, it switches the circuit back to the V.35 mode.

20 Claims, 2 Drawing Sheets

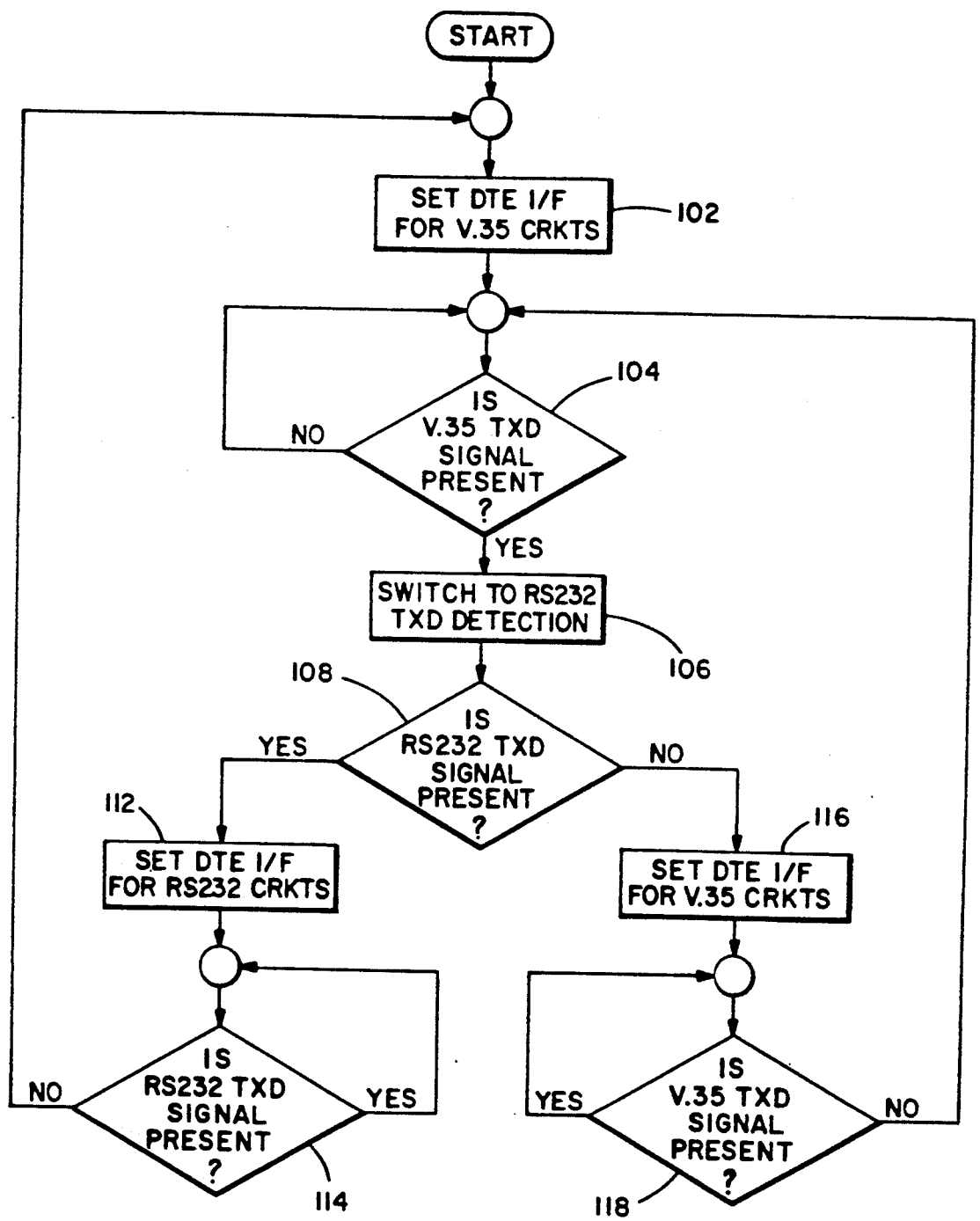
SOFTWARE FLOWCHART FOR RS232/V.35 AUTO DETECTION

AUTOMATIC DETECTOR AND SELECTOR OF RS-232 OR V.35 INTERFACE

BACKGROUND OF THE INVENTION

This invention broadly relates to data terminal interface circuits. More particularly, this invention relates to a terminal interface circuit which permits a user to connect devices using either a RS-232 or a V.35 interface to a transmission product without detailed knowledge of the interface and strapping requirements.

Interfaces between data terminals (DTE) and data communications equipment (DCE) are typically subject to standards. Among the standards for data terminal interfaces are the RS-232 and V.35 standards which govern the electrical characteristics for interchange circuits; i.e. electrical connectors. Details of the RS-232 and V.35 standards are published respectively in *Interface Between Data Terminal Equipment and Data Circuit—Terminating Equipment Employing serial Binary Data InterChange; EIA-232-D*; Electronics Industries Association (1987), and *CCITT Red Book*, Recommendations of the V Series.

It is generally desirable for multirate data communications equipment to be compatible with both RS-232 and V.35 standards so that the DTE can receive and transmit data using either format. Thus, DCE manufacturers often provide their DCE's with both RS-232 and V.35 capabilities. However, in order to operate the DCE, the user must know whether the interface being utilized is an RS-232 or V.35, and must configure the DCE (typically by hard strapping numerous berg jumpers, throwing switches, or plugging in appropriate modules) to be compatible with the interface. Moreover, if the line to which the DCE is connected is changed from an RS-232 compatible line to a V.35 compatible line or vice versa, the user must power down the DCE, reconfigure the DCE appropriately, and then power up the DCE. Further, if the user incorrectly configures the DCE; i.e. by making the wrong hard strap selections, communications interface failure can result.

SUMMARY OF THE INVENTION

It is therefore an object of the invention to provide an automatic detection circuit for determining whether a DCE is coupled to a RS-232 or to a V.35 interface cable.

It is another object of the invention to provide a system which automatically detects whether a DCE is coupled to a RS-232 or a V.35 interface cable, and which automatically configures the DCE appropriately in response thereto.

It is a further object of the invention to provide an automatic RS-232 /V.35 detection/selection interface system which is comprised at least partially of existing components of the DCE.

In accord with the objects of the invention, an automatic detection circuit is provided and broadly comprises: a switch coupled to pin 2 (pin P) of a DCE interface connector (TX data from DTE); a first line receiving circuit means (V.35) coupled to a first pole of the switch and to pin S of the DTE interface connector, wherein the first line receiving circuit means provides a first indication when neither of pins P and S receives an input signal, and provides a second indication when an input signal is present at at least one of pins P and S; and a second line receiving circuit means (RS-232) coupled to a second pole of the switch for providing a first indication when a valid RS-232 transmit data signal is detected and a second indication when a valid RS-232 transmit data signal is not detected. In conjunction with the detection circuit, an automatic selection circuit is comprised of a logic control means for switching the switch from contacting the first pole to contacting the second pole when the first line receiving circuit means provides an indication that an input signal is present, and for switching the switch from contacting the second pole to contacting the first pole when the second line receiving circuit means provides a an indication that a valid RS-232 transmit data signal is not detected. Preferably, the logic control means comprises a microprocessor already resident in the DCE and a relay means coupled to the microprocessor and the switch.

According to a first preferred aspect of the invention, the first line receiving circuit means comprises two differential line receivers and an AND gate. A first of the two differential line receiver has a positive input coupled to pin S of the DCE interface connector and a negative input coupled to a first pole of the switch (and hence pin P). The second differential line receiver has its positive input coupled to the first pole of the switch and its negative input coupled to pin S of the DCE. Each of the differential line receivers takes the differential signal received at its respective inputs and outputs a TTL signal in response thereto. The AND gate is coupled to the TTL outputs of the first and second line receivers.

According to another preferred aspect of the invention, the second line receiving circuit means comprises two line receivers and an XOR gate. A first of the two line receivers has its input threshold voltage level set to +1V (dc) while the second has its input threshold voltage level set to −1V (dc). The TTL outputs of the two line receivers of the second line receiving circuit means are taken as the inputs to the XOR gate.

Other objects and advantages of the present invention will become evident upon reference to the detailed description in conjunction with the provided figures.

BRIEF DESCRIPTION OF THE DRAWINGS

FIG. 2 is a flow chart of the automatic selector software utilized by the microprocessor of the system.

DETAILED DESCRIPTION OF THE PREFERRED EMBODIMENT

Figure 1:
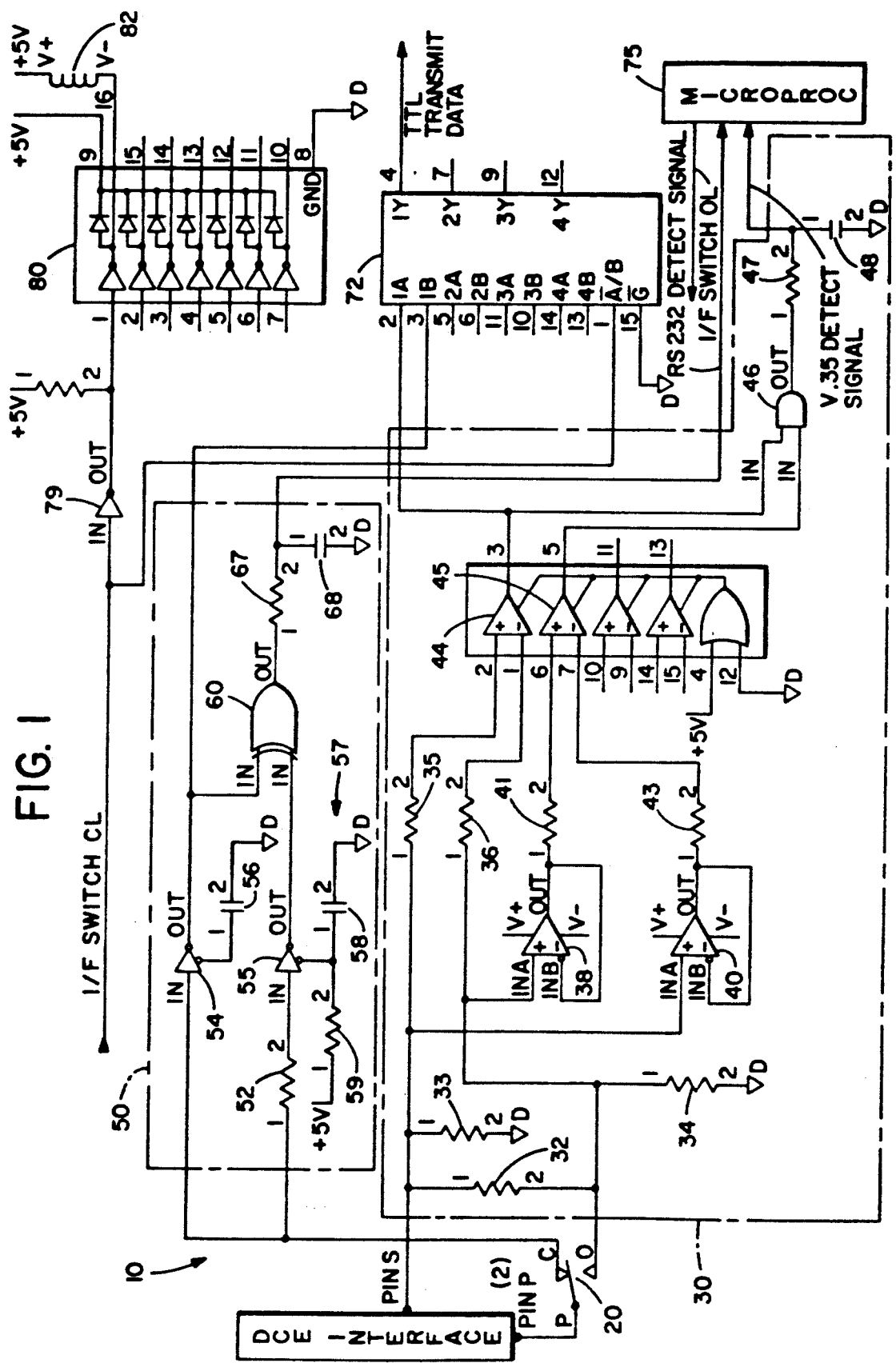
FIG. 1 is a circuit diagram of the preferred automatic detector circuit and a block diagram of the selector circuit of the invention.

The preferred automatic detector circuit 10 for determining whether a valid RS-232 signal or a valid V.35 signal is present at the connector pin interface of a DCE, or whether no signal is present is seen in FIG. 1. As seen in FIG. 1, the automatic detector circuit 10 is comprised of a switch 20, a first line receiving circuit 30, and a second line receiving circuit 50. Switch 20 is coupled to pin 2, which is also termed pin P (DTE data transmit) of a DeE interface connector. The first line receiving circuit means 30 is coupled to a first pole (0) of the switch 20 as well as to pin S of the DCE interface connector.

The first line receiving circuit means 30 includes impedance matching resistors 32, 33, 34, 35, 36, buffers 38 and 40 with associated resistors 41 and 43, differential line receivers 44 and 45, an AND gate 46, and an output RC filter circuit having resistor 47 and capacitor 48. The impedance matching resistors and buffers are provided to make the circuit comply with V.35 standards requirements, such that the terminal to terminal impedance appears as one hundred ohms, while the terminal to ground impedance appears as one hundred-fifty ohms. The differential line receivers 44 and 45 serve the function of determining whether any valid signal is being received over pin 2 (pin P) or pins P and S. In particular, differential line receiver 44 has its positive input coupled to pin S of the DCE interface connector and its negative input coupled to pin P via switch 20. The second differential line receiver 45 is inversely arranged with its positive input coupled to pin P via switch 20 and its negative input coupled to pin S of the DCE. Each of the differential line receivers takes the differential signal received at its respective inputs and outputs a TTL signal in response thereto. Where there is no difference in the signals received at the inputs, the differential line receivers output a binary one (5V); whereas, where there is a difference of 0.2V or more between the inputs, the differential line receivers output the binary equivalent of the differential data; i.e. a "1" is output as 5V, and a "0" is output as 0V.

According to the standards, a valid V.35 signal provides a differential voltage on pins P and S of 0.55V ±20%, with a binary zero being indicated when terminal "A" is positive with respect terminal "B" and a binary one (5V) being indicated otherwise. Thus, if a differential voltage appears on pins P and S, with pin P being the higher voltage, line receiver 44 will output a binary zero, while line receiver 45 will output a binary one. If a differential voltage appears on pins P and S, with pin S being the higher voltage, line receiver 45 will output a binary zero, while line receiver 44 will output a binary one. As a result, when a differential voltage appears on pins P and S, AND gate 46 always provides a low output, as one input to AND gate 46 is high and the other is low. Also, when no differential voltage appears on pins P and S, AND gate 46 will provide a high output, as both outputs from line receivers 44 and 45 will be high. Regardless of the output provided by AND gate 46, it will be appreciated that the data output by the line receiver 44 is fed to an input port (2) of multiplexer 72. As will be discussed in more detail hereinafter, multiplexer 72 controls whether V.35 or RS-232 data is to be passed through the detector circuit 10.

The second line receiving circuit means 50 includes as components a resistor 52, two line receivers 54 and 55, with line receiver 54 having voltage threshold setting capacitor 56, and line receiver 55 having a voltage setting circuit 57 comprised of a capacitor 58 and a resistor 59, an XOR gate 60, and an output RC filter circuit having resistor 67 and capacitor 68. The input to line receiver 54 is connected directly to the second pole (C) of switch 20, while the input to line receiver 55 is coupled to pole C of switch 20 via resistor 52. Preferably, capacitor 56 is chosen such that line receiver 54 provides a logic one output (5V) when the voltage at the input is less than one volt, and a logic zero output (0V) when the voltage at the input is more than one volt. Similarly, capacitor 58 and resistor 59 are chosen such that line receiver 55 provides a logic one output when the voltage at the input to the line receiver 55 is less than −1V, and a logic zero output when the voltage is more than −1 V.

According to RS-232 standards, a valid RS-232 signal is a voltage signal on pin 2 (pin P) of between 3 and 12V for a space, and −3 and −12V for a mark. With the arrangement of the second line receiving circuit means 50, when the voltage at pin 2 is between −3 and −12V (actually, less than −1V), the output of line receiver 54 goes high while the output of line receiver 55 also goes high. When the voltage at pin 2 is between 3 and 12V (actually, more than 1V), the output of line receiver 54 goes low, as does the output of line receiver 55. Thus, in both cases, XOR gate 60 will provide a low output (0V), as the inputs into XOR gate 60 will be identical. On the other hand, if the voltage at pin 2 is between −1 and −1 volts, the output of line receiver 54 is high while the output of line receiver 55 is low. With one high and one low signal input into XOR gate 60, XOR gate 60 provides a high (+5V) output. Effectively, then, the output of XOR gate 60, as filtered by the RC filter comprised of resistor 67 and capacitor 68, provides an indication of whether RS-232 data is being input onto pin 2 of the DTE. Again, regardless of the output of XOR gate 60, the output of line receiver 54 is fed to a port (3) of the multiplexer 72, which under control of a microprocessor passes either the data signal coming from the RS-232 line receiving circuit means 50 or the data coming from the V.35 line receiving circuit means 30.

As aforementioned, the filtered outputs of XOR gate 60 and AND gate 46 are fed to a microprocessor 75 which is preferably already part of the existing components of the DCE. In response to the signals received, the microprocessor 75 performs two functions: it controls multiplexer 72; and it controls (via buffer 79) relay driver 80, and hence relay 82 which controls switch 20.

Details of the functioning of the microprocessor 75 with regard to the automatic detector circuit 10 are seen with reference to FIG. 2. At step 102, the microprocessor sets the DTE interface to permit a determination of whether a V.35 signal is present; i.e., the microprocessor 75 provides a signal on its output line which causes relay driver 80 to cause relay 82 to throw switch 20 onto the "0" pole. Then, at step 104, utilizing the signal at the output of AND gate 46, the microprocessor determines whether a differential voltage on pins P and S is present which might be indicative of either a valid V.35 or a valid RS-232 transmit data signal. If not, the microprocessor continues to cycle until such a determination is made. Once it is determined that a signal is being received, at step 106, microprocessor 75 outputs a signal to relay driver 80 which causes 11 relay 82 to throw switch 20 to the "C" pole. With switch 20 thrown, the output of XOR gate 60 is used by the microprocessor 75 at step 108 to determine whether a valid RS-232 transmit data signal is present. If a valid RS-232 transit data signal is present, switch 20 is kept with pole C being contacted (step 112), and the output of the XOR gate 60 is monitored at 114 to guarantee that the signal is still there. As long as a valid RS-232 transmit data signal is being received, the program cycles at step 114. However, should the XOR gate output indicate to the microprocessor that a valid RS-232 transmit data signal is no longer being received, the program returns to step 102 where switch 20 is switched to contact the "0" pole so as to check for a differential voltage on pins P and S. The program then continues through steps 104, 106, and 108, where a determination is made whether a valid RS-232 transmit data signal is present. If not, at 116, the DTE interface is set for a V.35 signal; i.e., pole "0" of switch 20 is contacted. At step 118, the output of AND gate 46 is monitored by the microprocessor to guarantee that a valid V.35 signal is still being received. If not, the program returns to step 104.

It will be appreciated that the output signal of the microprocessor which controls the relay driver 80 is also input to the port 1 control input of multiplexer 72. Thus, the changing of switch 20 to provide the input data to the RS-232 line receiving circuit means 50 is accompanied with a control to multiplexer 72 to cause the data passing through the automatic detector circuit to be the RS-232 data. Likewise, the changing of switch 20 to provide the input data to the V.35 line receiving circuit means 30 is accompanied with a control to multiplexer 72 to cause the data passing through the automatic detector circuit 10 to be V.35 data. It will also be appreciated, that upon the determination by the microprocessor of the type of TX data that is incoming to the DCE, the microprocessor causes relay control 80 to close other relays (not shown), which relate to a DCE generated RX and TX clock, a DTE generated TX clock, and the receive data line/lines to the DTE.

There has been described and illustrated herein an automatic detection and selection circuit for detecting and distinguishing receipt by a DCE of data via a V.35 and via an RS-232 interface, and for selecting circuitry for passing the data therethrough in response thereto. While a particular embodiment has been described, there is no intent to be limited thereto, as the invention is intended to be as broad in scope as the art will allow. Thus, for example, while particular types of line receivers and logic gates were described, it will be appreciated that other circuitry providing similar functions could be utilized instead of the line receivers and logic gates described. Also, while particular voltage thresholds were described as being preferred for determining whether a valid RS-232 signal is present, it will be appreciated that different voltage thresholds could be utilized. Further, while a particular software flow chart for the microprocessor was described, it will be appreciated that other algorithms could be utilized. Therefore, it will be apparent to those skilled in the art that other changes and modifications may be made to the invention as described in the specification without departing from the spirit and scope of the invention as so claimed.

We claim:

1. An automatic detection circuit resident in a DCE and coupled to an interface connector of the CE for detecting receipt by the DCE of V.35 and RS-232 transmit data signals, and distinguished between those signals, the automatic detection circuit comprising:
   a) switch means coupled to a first TX data terminal of said DCE interface connector, said switch means having at least a first pole and a second pole;
   b) a first line receiving circuit means coupled to said first pole of said switch means and to a second TX data terminal of said DCE interface connector, wherein said first line receiving circuit means provides a first signal indicating that no. V.35 or RS232 transmit data signal is being received when neither said first and second TX data terminals receives an input signal, and provides a second signal indicating that a transmit data signal is being receives when an input signal is present at at least one of said first and second TX data terminals; and
   c) a second line receiving circuit means coupled to said second pole of said switch means for providing a third signal indicating that said transmit data signal is a RS-232 signal when a valid RS-232 transmit data signal is detected, and a fourth signal when a valid RS-232 transmit data signal is not detected, wherein the presence of said second signal followed by said fourth signal indicates that said data transmit signal is a V.35 signal.

2. An automatic detection circuit according to claim 1, wherein:
   said first line receiving circuit means comprises
      a first differential line receiver having a positive input coupled to said second TX data terminal of said DCE interface connector, a negative input coupled to said first pole of said switch means, and an output, and
      a second differential line receiver having a positive input coupled to said first pole of said switch means, a negative input coupled to said second TX data terminal of said DCE interface connector, and an output.

3. An automatic detection circuit according to claim 2, wherein:
   said first line receiving circuit means further comprises an AND gate means having said outputs of said first and second differential line receivers as inputs thereto.

4. An automatic detection circuit according to claim 3, wherein:
   said first and second differential line receivers comprise means for taking differential signals received at their inputs and generating TTL signals in response thereto.

5. An automatic detection circuit according to claim 1, wherein:
   said second line receiving circuit means comprises
      a first line receiver having an input coupled to said second pole of said switch means, a threshold voltage control input, and an output,
      means coupled to said threshold voltage control input of said first line receiver for providing thereto a voltage arranged to set the threshold voltage of said first one receiver to a first predetermined level,
      a second line receiver having an input coupled to said second pole of said switch means, a threshold voltage control input, and an output
      means coupled to said threshold voltage control input of said second line receiver for providing thereto a voltage arranged to set the threshold voltage of said second line receiver to a second predetermined level, said second predetermined level being different than said first predetermined level.

6. An automatic detection circuit according to claim 5, wherein:
   said second line receiving circuit means further comprises XOR gate means having said outputs of said first and second line receivers as inputs thereto.

7. An automatic detection circuit according to claim 6, wherein:
   said first and second line receivers comprises means for taking signals received at their inputs and generating TTL signals in response thereto.

8. An automatic detection circuit according to claim 4, wherein:
   said second line receiving circuit means comprises
      a first line receiver having an input coupled to said second pole of said switch means, a threshold voltage control input, and an output,
      means coupled to said threshold voltage control input of said first line receiver for providing thereto a voltage arranged to set the threshold voltage of said first line receiver to a first predetermined level, a secondline receiver having an input coupled to said second pole of said switch means, a threshold voltage control input, and an output means coupled to said threshold voltage control input of said second line receiver for providing thereto a voltage arranged to set the threshold voltage of said second line receiver to a second predetermined level, said second predetermined level being different than said first predetermined level.

9. An automatic detection circuit according to claim 8, wherein:

said second line receiving circuit means further comprises XOR gate means having said outputs of said first and second line receivers as inputs thereto.

10. An automatic detection circuit according to claim 9, wherein:

said first and second differential line receivers comprise means for taking differential signals received at their inputs and generating TTL signals in response thereto, and said first and second line receivers comprise means for taking signals received at their inputs and generating TTL signals in response thereto.

11. An automatic detection circuit according to claim 5, wherein:

said means coupled to said threshold voltage control input of said first line receiver for providing thereto a voltage, provides a voltage which sets the threshold voltage of said first line receiver to approximately +1V, and said means coupled to said threshold voltage control input of said second line receiver for providing thereto a voltage, provides a voltage which sets the threshold voltage of said second line receiver to approximately −1V.

12. An automatic detection circuit according to claim 8, wherein:

said means coupled to said threshold voltage control input of said first lie receiver for providing thereto a voltage provides a voltage which sets the threshold voltage of said first line receiver to approximately +1V, and said means coupled to said threshold voltage control input of said second line receiver for providing thereto a voltage, provides a voltage which sets the threshold voltage of said second line receiver to approximately −1V.

13. An automatic detection and selection circuit resident in a DCE and coupled to an interface connector of the DCE for detecting receipt by the DCE of V.35 and RS-232 transmit data signals and distinguishing between those signals, and for selecting circuitry for passing the data therethrough, the automatic detection and selection circuit comprising:

a) switch means coupled to a first TX data terminal of said DCE interface connector, said switch means having at least a first pole and a second pole;

b) a first line receiving circuit means coupled to said first pole of said switch means and to a second TX data terminal of said DCE interface connector, wherein said first line receiving circuit means provides at an output a first signal indicating that no V.35 or RS-232 transmit data signal is being received when neither said first and second TX data terminals receives an input signal, and provides a second signal indicating that a transmit data signal is being receives when an input signal is present at at least one of said first and second TX data terminals; and c) a second line receiving circuit means coupled to said second pole of said switch means for providing a third signal indicating that said transmit data signal is a RS-232 signal when a valid RS-232 transmit data signal is detected, and a fourth signal when a valid RS-232 transmit data signal is not detected; and d) logic control means for switching said switch from contacting said first pole to contacting said second pole when said second signal is provided by said first line receiving circuit means, and for switching said switch means from contacting said second pole to contacting said first pole when, after said second signal is provided by said first line receiving circuit means, said second line receiving circuit means provides said fourth signal, wherein the presence of said second signal followed by said fourth signal indicates that said data transmit signal is a V.35 signal.

14. An automatic detection and selection circuit according to claim 13, wherein:

said logic control means comprises microprocessor means coupled to said output of said first line receiving circuit means, for receiving said first signal and said second signal of said first line receiving circuit means and determining therefrom whether a stat signal is being received by said automatic detection and selection circuit, and for generating a control signal in response thereto, and relay means coupled to said microprocessor means and controlling said switch means, for causing said switch means to switch from contacting said first pole to said second pole and vice versa when said microprocessor means generates control signals requiring the same.

15. An automatic detection and selection circuit resident in a DCE and coupled to an interface connector of the DCE for detecting receipt by the DCE of V.35 and RS-232 transmit data signals and distinguishing between those signals, and for selecting circuitry for passing the data therethrough, the automatic detection and selection circuit comprising:

a) switch means coupled to a first Tx data terminal of said DCE interface connector, said switch means having at least a first pole and a second pole;

b) a first line receiving circuit means coupled to said first pole of said switch means and to a second TX data terminal of said DCE interface connector, wherein said first line receiving circuit means provides at an output a first signal indicating that no V.35 or RS-232 transmit data signal is being received when neither said first and second TX data terminals receives an input signal, and provides a second signal indicating that a transmit data signal is being receives when an input signal is present at at least one of said first and second TX data terminals; and c) a second line receiving circuit means coupled to said second pole of said switch means for providing at an output a third signal indicating that said transmit data signal is a RS-232 signal when a valid RS-232 transmit data signal is detected, and a fourth signal when a valid RS-232 transmit data signal is not detected wherein the presence of said second signal followed by said fourth signal indicates that said data transmit signal is a V.35 signal;

d) microprocessor means coupled to said output of said first line receiving circuit means, for receiving said first signal and said second signal of said first line receiving circuit means and determining therefrom whether a data signal is being received by said automatic detection and selection circuit, and for generating a control signal in response thereto; and e) relay means coupled to said microprocessor means and controlling said switch means, for causing said switch means to switch data flow from said first pole to said second pole when said microprocessor mans generates a control signal requiring the same.

16. An automatic detection and selection circuit according to claim 15, wherein:

said microprocessor means is coupled to said output of said second line receiving circuit means, for receiving said third signal and said fourth signal of said second line receiving circuit means and determining therefrom whether a valid RS-232 data signal is being received by said automatic detection and selection circuit, and for generating a control signal in response thereto, wherein said relay means causes said switch means to switch data flow from said second pole to said first pole when said microprocessor means generates a control signal indicative of the fact that no valid RS-232 data signal is being received by said automatic detection and selection circuit.

17. An automatic detection and selection circuit according to claim 16, wherein:

said first line receiving circuit means comprises
a first differential one receiver having a positive input coupled to said second TX data terminal of said DCE interface connector, a negative input coupled to said first pole of said switch means, and an output, and
a second differential line receiver having a positive input coupled to said first pole of said switch means, a negative input coupled to said second TX data terminal of said DCE interface connector, and an output, and said second line receiving circuit means comprises
a first line receiver having an input coupled to said second pole of said switch means, a threshold voltage control input, and an output,
means coupled to said threshold voltage control input of said first line receiver for providing thereto a voltage arranged to set the threshold voltage of said first line receiver to a first predetermined level,
a second line receiver having an input coupled to said second pole of said switch means, a threshold voltage control input, and an output
means coupled to said threshold voltage control input of said second line receiver for providing thereto a voltage arranged to set the threshold voltage of said second line receiver to a second predetermined level, said second predetermined level being different than said first predetermined level.

18. An automatic detection and selection circuit according to claim 17, further comprising:

f) multiplexer means having a control input coupled to said microprocessor means, a first data input coupled to an output of one of said first and second line receiver means of said second line receiving circuit means, and a second data input coupled to an output of one of said first and second differential line receiver means of said first line receiving circuit means, whereby when said microprocessor means determines that a valid V.35 data signal is being received by said automatic detection and selection circuit, said microprocessor means causes said multiplexer means to pass data received at the output of one of said first and second differential one receiver means, and when said microprocesssor means determines that a valid RS-232 data signal is being received by said automatic detection and selection circuit, said microprocessor means causes said multiplexer means to pass data received at the output of one of said first and second line receiver means.

19. An automatic detection and selection circuit according to claim 18, wherein:

said first line receiving circuit means further comprises an AND gate means having said outputs of said first an second differential line receivers as inputs thereto, and
said second line receiving circuit means further comprises XOR gate means having said outputs of said first and second line receivers as inputs thereto.

20. An automatic detection and selection circuit according to claim 19, wherein:

said first and second differential line receivers comprise means for taking differential signals received at their inputs and generating TT1 signals in response thereto, and
said first and second line receivers comprise means for taking signals received at their inputs and generating TTL signals in response thereto.

* * * * *